US008270832B2

(12) United States Patent
Luo et al.

(10) Patent No.: US 8,270,832 B2
(45) Date of Patent: Sep. 18, 2012

(54) METHOD AND APPARATUS FOR SYNCHRONIZATION IN A PASSIVE OPTICAL NETWORK

(75) Inventors: Yuanqiu Luo, Shenzhen (CN); Frank Effenberger, Bridgewater, NJ (US)

(73) Assignee: FutureWei Technologies, Inc., Plano, TX (US)

( * ) Notice: Subject to any disclaimer, the term of this patent is extended or adjusted under 35 U.S.C. 154(b) by 0 days.

(21) Appl. No.: 13/335,593

(22) Filed: Dec. 22, 2011

(65) Prior Publication Data

US 2012/0093513 A1    Apr. 19, 2012

Related U.S. Application Data

(63) Continuation of application No. 12/683,330, filed on Jan. 6, 2010.

(60) Provisional application No. 61/142,797, filed on Jan. 6, 2009.

(51) Int. Cl.
*H04J 14/00* (2006.01)
(52) U.S. Cl. ............. 398/67; 398/71; 398/72; 398/74
(58) Field of Classification Search ............ 398/58, 398/66–68, 70–72, 74
See application file for complete search history.

(56) References Cited

U.S. PATENT DOCUMENTS

| 6,449,111 | B1 | 9/2002 | Kool et al. | |
|---|---|---|---|---|
| 7,349,537 | B2 | 3/2008 | Kramer et al. | |
| 7,894,485 | B2 | 2/2011 | Frank et al. | |
| 7,983,308 | B1 * | 7/2011 | Johnston et al. | 370/514 |
| 7,991,296 | B1 * | 8/2011 | Johnston et al. | 398/154 |
| 2002/0171895 | A1 * | 11/2002 | Chang | 359/168 |
| 2003/0007508 | A1 | 1/2003 | Sala et al. | |
| 2007/0127554 | A1 | 6/2007 | Tamai et al. | |
| 2007/0291777 | A1 | 12/2007 | Jamieson et al. | |
| 2010/0158530 | A1 * | 6/2010 | Soto et al. | 398/79 |
| 2010/0296523 | A1 | 11/2010 | Wego et al. | |

FOREIGN PATENT DOCUMENTS

| DE | 3832946 A1 | 4/1990 |
|---|---|---|
| DE | 4015283 A1 | 11/1991 |
| EP | 1890410 A1 | 2/2008 |

OTHER PUBLICATIONS

International Search Report of corresponding PCT Patent Application No. PCT/US2010/020262, mailed May 7, 2010, 4 pages total.
Written Opinion of corresponding PCT Patent Application No. PCT/US2010/020262, mailed May 7, 2010, 6 pages total.

(Continued)

*Primary Examiner* — Dalzid Singh

(57) ABSTRACT

A method, apparatus and system for aligning frames in which an Optical Network Unit (ONU) receives a frame comprising frame delimitation information and synchronization-related information; performs a first verification based on a comparison of the frame delimitation information and a fixed pattern; performs a second verification based on a comparison of the synchronization-related information and a value associated with synchronization-related information in a previously received frame; proceeds to a synchronization state if both the first verification and the second verification are successful; and returns to a hunt state if either the first verification or the second verification fails.

20 Claims, 9 Drawing Sheets

OTHER PUBLICATIONS

ITU-T Recommendation G.984.1, "Series G:Transmission Systems and Media ,Digital Systems and Networks—Digital Sections and Digital Line System—Optical Line Systems for Local and Access Networks—Gigabit-Capable Passive Optical Networks(G-PON):General Characteristics," ITU-T Study Group 15, Mar. 2008, 43 pages total.

ITU-T Recommendation G.984.3, "Series G: Transmission Systems and Media ,Digital Systems and Networks—Digital Sections and Digital Line System—Optical Line Systems for Local and Access Networks—Gigabit-Capable Passive Optical Networks(G-PON): Transmission Convergence Layer Specification," ITU-T Study Group 15, Feb. 2004, 116 pages total.

Kihara et al., "System Configuration for Standardizing SDG-Based Time and Frequency Transfer," European Frequency and Time Forum, 1996. EFTF 96., Tenth (IEE Conf. Publ. 418), Mar. 5-7, 1996, pp. 465-470 ; retrieved from the Internet: <http://ieeexplore.ieee.org/stamp/stamp.jsp?tp=&arnumber=584909>.

Tsang et al., "GigaPON Access Network Top Level Specification of the PTSP, TC and MAC Components," IST-2001-34523-GIANT, Mar. 12, 2003, Retrieved from the Internet: <http://www.ist-optimist.org/pdf/networ k/projects_public/GIANT/Deliver ables/D41.pdf>, 38 pages total.

First Office Action of Parent U.S. Appl. No. 12/683,330, mailed on Feb. 13, 2012, 13 pages total.

* cited by examiner

METHOD AND APPARATUS FOR SYNCHRONIZATION IN A PASSIVE OPTICAL NETWORK

CROSS-REFERENCE TO RELATED APPLICATIONS

This application is a continuation of U.S. patent application Ser. No. 12/683,330, filed on Jan. 6, 2010, which claims priority to U.S. Provisional Patent Application No. 61/142,797, filed Jan. 6, 2009. The aforementioned patent applications are hereby incorporated by reference in their entireties.

TECHNICAL FIELD

The present invention relates to the field of optical communications, and in particular, to a method, apparatus and system for synchronization in a passive optical network (PON).

BACKGROUND

In communication systems, frame alignment may be needed to enable a receiver to synchronize an incoming bit stream in a frame and to extract the data in the frame for further processing. Typically, frame alignment is achieved using a distinctive bit sequence in the frame to distinguish the frame beginning and/or end and to locate the actual data in the frame. The bit sequence for frame alignment may also be referred to as a synchronization pattern or framing bits. The synchronization patterns used in communication systems are usually fixed bit sequences that are located at specified positions in the frame. The synchronization patterns can occur repeatedly in a sequence of frames or bit streams and do not carry additional information besides indicating the beginning and/or end of a frame. Improving such frame alignment or synchronization schemes may increase frame processing efficiency in communication systems.

SUMMARY

An embodiment of the present invention consists of a method for synchronization performed by an optical network unit (ONU) in a passive optical network (PON), comprising: receiving a frame comprising frame delimitation information and synchronization-related information; performing a first verification based on a comparison of the frame delimitation information and a fixed pattern; performing a second verification based on a comparison of the synchronization-related information and a value associated with synchronization-related information in a previously received frame; proceeding to a synchronization state if both the first verification and the second verification are successful; and returning to a hunt state if either the first verification or the second verification fails.

Another embodiment of the present invention consists of an optical network unit (ONU), comprising: a receiver configured to receive frames from an optical line terminal (OLT); a processor coupled to the receiver and configured to: obtain frame delimitation information and synchronization-related information from a frame received from the OLT; perform a first verification based on a comparison of the frame delimitation information and a fixed pattern; perform a second verification based on a comparison of the synchronization-related information and a value associated with synchronization-related information in a previously received frame from the OLT; cause the ONU to proceed to a synchronization state if both the first verification and the second verification are successful; and cause the ONU to return to a hunt state if either the first verification or the second verification fails.

A further embodiment of the present invention consists of a passive optical network (PON) system, comprising: an optical line terminal (OLT); and at least one optical network unit (ONU) coupled to the OLT and configured to: receive a frame comprising frame delimitation information and synchronization-related information from the OLT; perform a first verification based on a comparison of the frame delimitation information and a fixed pattern; perform a second verification based on a comparison of the synchronization-related information and a value associated with second synchronization-related information for a previously received frame from the OLT; proceed to a synchronization state if both the first verification and the second verification are successful; and return to a hunt state if either the first verification or the second verification fails.

These and other features will be more clearly understood from the following detailed description taken in conjunction with the accompanying drawings and claims.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are embodiments of a method, apparatus and system for improving frame alignment of a bit stream, which may improve frame processing efficiency in a network. Specifically, an improved synchronization pattern for frame alignment may be inserted in a frame or bit stream. The improved synchronization pattern may indicate a beginning and/or end of the frame and additional information about the data in the frame. At least in some embodiments, the additional information may be based on the data and hence may change in different frames that comprise different data. Additionally, a synchronization state machine may be configured to predict a synchronization pattern in a next transported frame, e.g. with high or acceptable accuracy, using a synchronization pattern in at least one previously received frame. The frame alignment scheme may be used in different networks that may be based on different technologies or protocols, including PONs, Gigabit PON (GPON) systems, and Next Generation Access (NGA) systems.

Figure 1:
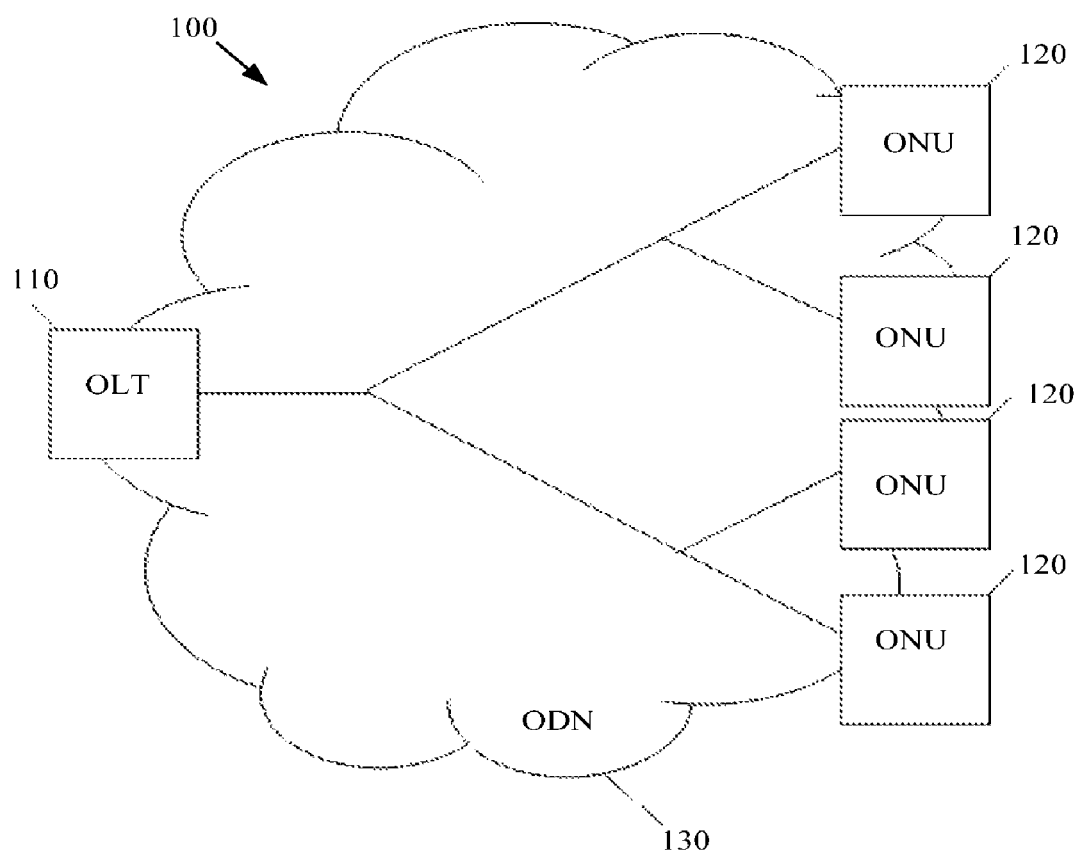
FIG. 1 is a schematic diagram of an embodiment of a passive optical network (PON).

FIG. 1 illustrates one embodiment of a PON 100, which may be one system for providing network access over "the last mile." The PON 100 may be a point to multi-point network comprised of an optical line terminal (OLT) 110, a plurality of optical network units (ONUs) 120, and an optical distribution network (ODN) 130 that may be coupled to the OLT 110 and the ONUs 120. For instance, the OLT 110 may be located at a central office (CO), the ONUs 120 may be located at a plurality of customer premises, and the ODN 130 may be positioned between the OLT 110 and the ONUs 120. The PON 100 may be a communications network that does not require any active components to distribute data between the OLT 110 and the ONUs 120. Instead, the PON 100 may use the passive optical components in the ODN 130 to distribute data between the OLT 110 and the ONUs 120.

In an embodiment, the PON 100 may be GPON system, where downstream data may be broadcasted at about 2.5 Gigabits per second (Gbps) and upstream data may be transmitted at about 1.25 Gbps. In another embodiment, the PON 100 may be a NGA system, which may be configured to transport a plurality of data frames with improved reliability and efficiency at higher bandwidths. For instance, the PON 100 may be a ten Gbps GPONs (or XGPONs), which may have a downstream bandwidth of about ten Gbps and an upstream bandwidth of at least about 2.5 Gbps. Other examples of suitable PONs 100 include the asynchronous transfer mode PON (APON) and the broadband PON (BPON) defined by the ITU-T G.983 standard, the GPON defined by the ITU-T G.984 standard, the Ethernet PON (EPON) defined by the IEEE 802.3ah standard, and the Wavelength Division Multiplexed (WDM) PON (WPON), all of which are incorporated herein by reference as if reproduced in their entirety.

In an embodiment, the OLT 110 may be any device that is configured to communicate with the ONUs 120 and another network (not shown). Specifically, the OLT 110 may act as an intermediary between the other network and the ONUs 120. For instance, the OLT 110 may forward data received from the network to the ONUs 120, and forward data received from the ONUs 120 onto the other network. Although the specific configuration of the OLT 110 may vary depending on the type of PON 100, in an embodiment, the OLT 110 may comprise a transmitter and a receiver. When the other network is using a network protocol, such as Ethernet or Synchronous Optical Networking/Synchronous Digital Hierarchy (SONET/SDH), that is different from the PON protocol used in the PON 100, the OLT 110 may comprise a converter that converts the network protocol into the PON protocol. The OLT 110 converter may also convert the PON protocol into the network protocol. The OLT 110 may be typically located at a central location, such as a central office, but may be located at other locations as well.

In an embodiment, the ONUs 120 may be any devices that are configured to communicate with the OLT 110 and a customer or user (not shown). Specifically, the ONUs 120 may act as an intermediary between the OLT 110 and the customer. For instance, the ONUs 120 may forward data received from the OLT 110 to the customer, and forward data received from the customer onto the OLT 110. Although the specific configuration of the ONUs 120 may vary depending on the type of PON 100, in an embodiment, the ONUs 120 may comprise an optical transmitter configured to send optical signals to the OLT 110 and an optical receiver configured to receive optical signals from the OLT 110. Additionally, the ONUs 120 may comprise a converter that converts the optical signal into electrical signals for the customer, such as signals in the Ethernet protocol, and a second transmitter and/or receiver that may send and/or receive the electrical signals to a customer device. In some embodiments, ONUs 120 and optical network terminals (ONTs) are similar, and thus the terms are used interchangeably herein. The ONUs 120 may be typically located at distributed locations, such as the customer premises, but may be located at other locations as well.

In an embodiment, the ODN 130 may be a data distribution system, which may comprise optical fiber cables, couplers, splitters, distributors, and/or other equipment. In an embodiment, the optical fiber cables, couplers, splitters, distributors, and/or other equipment may be passive optical components. Specifically, the optical fiber cables, couplers, splitters, distributors, and/or other equipment may be components that do not require any power to distribute data signals between the OLT 110 and the ONUs 120. Alternatively, the ODN 130 may comprise one or a plurality of processing equipment, such as optical amplifiers. The ODN 130 may typically extend from the OLT 110 to the ONUs 120 in a branching configuration as shown in FIG. 1, but may be alternatively configured in any other point-to-multi-point configuration.

In an embodiment, the OLT 110 and the ONUs 120 may exchange data that may be encapsulated in frames or packets, e.g. Ethernet frames. The frames may comprise payload and header, which may comprise synchronization and configuration information. For instance, a transmission convergence (TC) frame may be used to transmit information downstream, e.g. from the OLT 110 to an ONU 120, based a GPON Transmission Convergence (GTC) protocol layer. The GTC is defined in ITU-T G.984.3, which is incorporated herein by reference. The TC frame may also comprise a physical synchronization (PSync) field, which may indicate a beginning of the TC frame. Typically, the PSync field may comprise a fixed code, which may have a fixed value of "0xB6AB31E0" (in hexadecimal format) that indicates the beginning of the frame. The size of such field may be equal to about four bytes. A receiver at the OLT 110 or ONU 120 may use the PSync fields in the received frames to delimit, e.g. separate and distinguish, the frames.

In an embodiment, the PSync field may be replaced with an improved synchronization pattern, which may be a modified PSync field. The modified PSync field may indicate the beginning (or end) of the frame and comprise other information. The additional information in the PSync field may further improve frame synchronization, e.g. at a receiver in the OLT 110 or the ONU 120. For instance, the additional information may be synchronization related information, such as timing information. The synchronization pattern may be processed by a synchronization state machine, which may be coupled to the receiver. The synchronization state machine may be implemented using hardware, software, or both. The synchronization state machine may obtain a plurality of synchronization patterns, which may comprise different but related synchronization information, and use this information to improve data synchronization and frame alignment. As such, the synchronization efficiency in the network may be enhanced and overall system performance may be improved.

Figure 2:
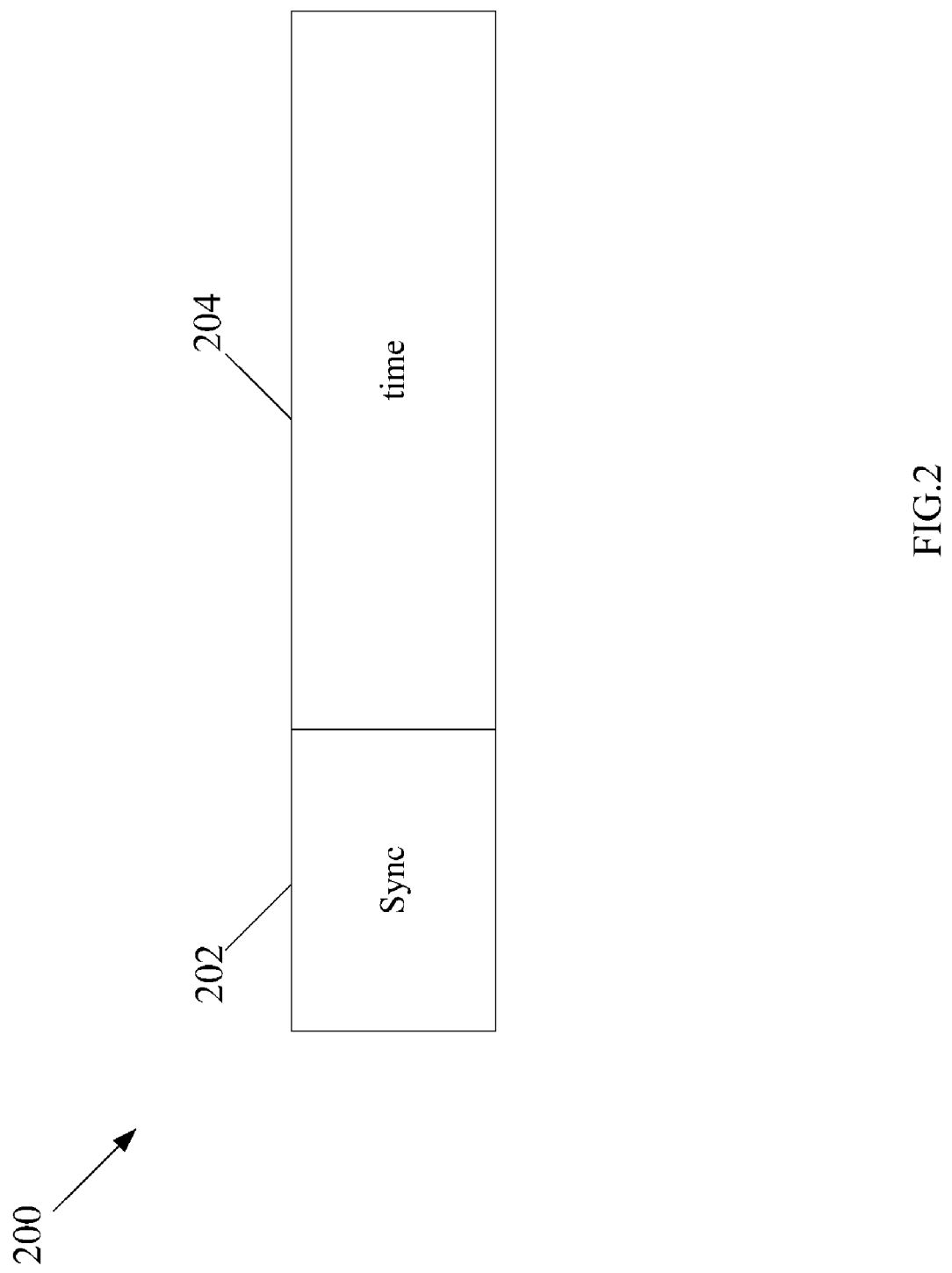
FIG. 2 is an illustration of an embodiment of a synchronization field.
Figure 3:
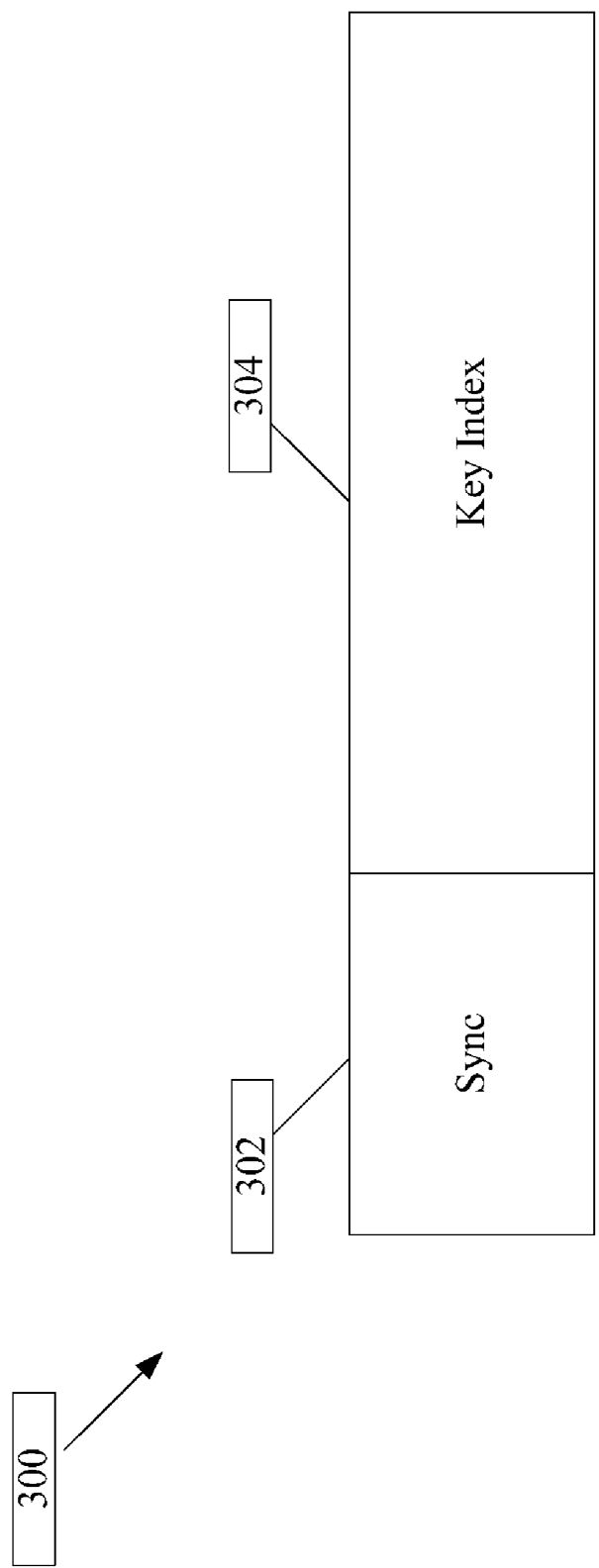
FIG. 3 is an illustration of another embodiment of a synchronization field.
Figure 4:
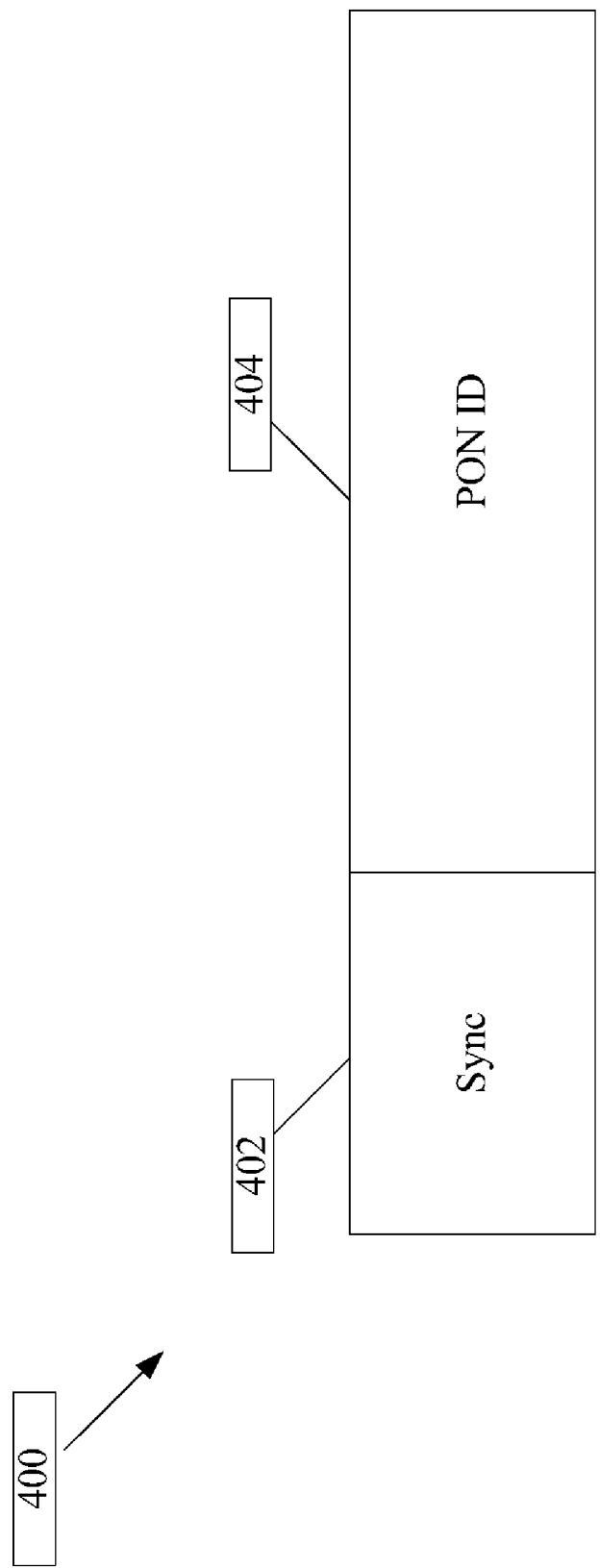
FIG. 4 is an illustration of another embodiment of a synchronization field.
Figure 5:
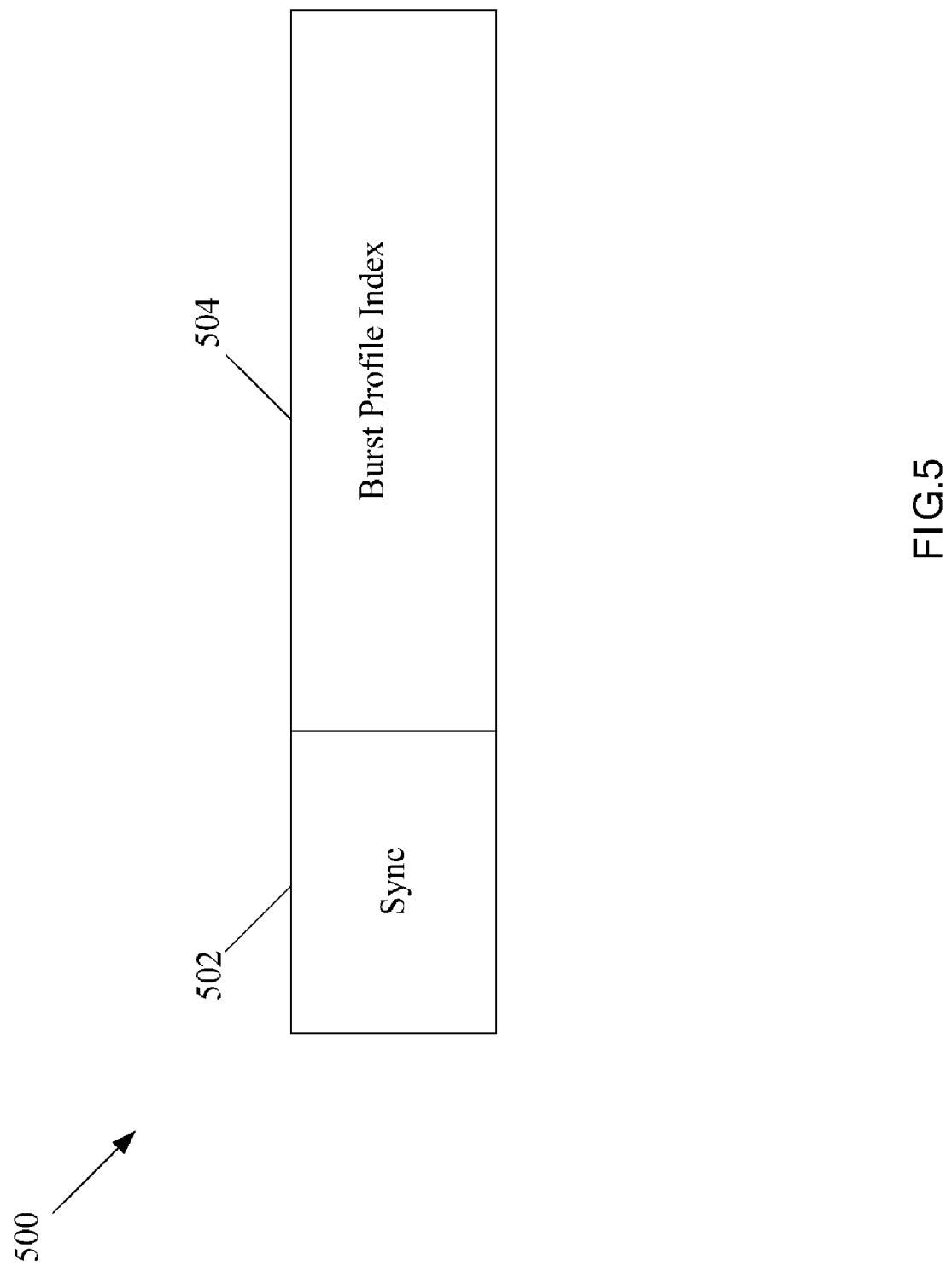
FIG. 5 is an illustration of another embodiment of a synchronization field.
Figure 6:
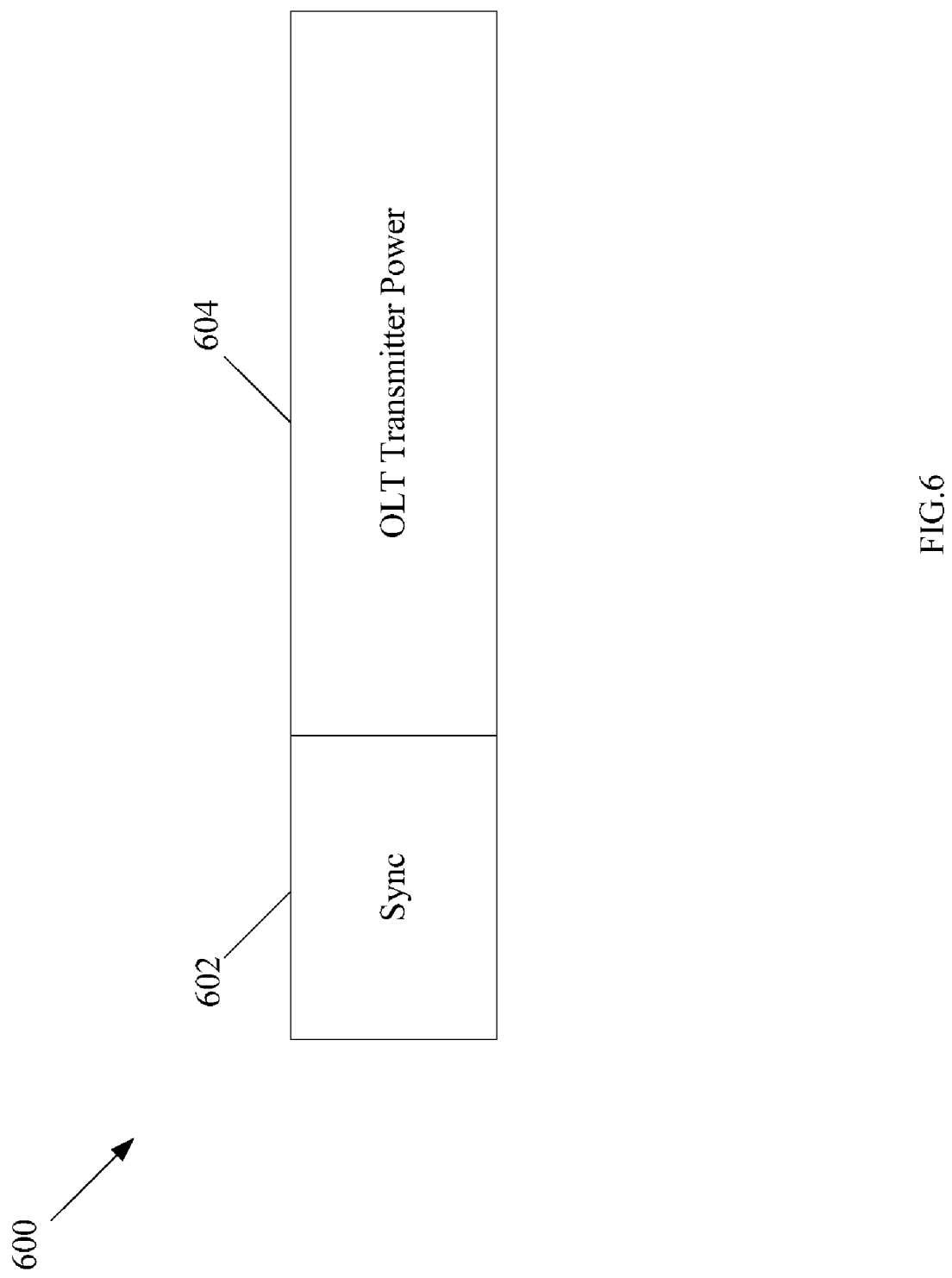
FIG. 6 is an illustration of another embodiment of a synchronization field.
Figure 7:
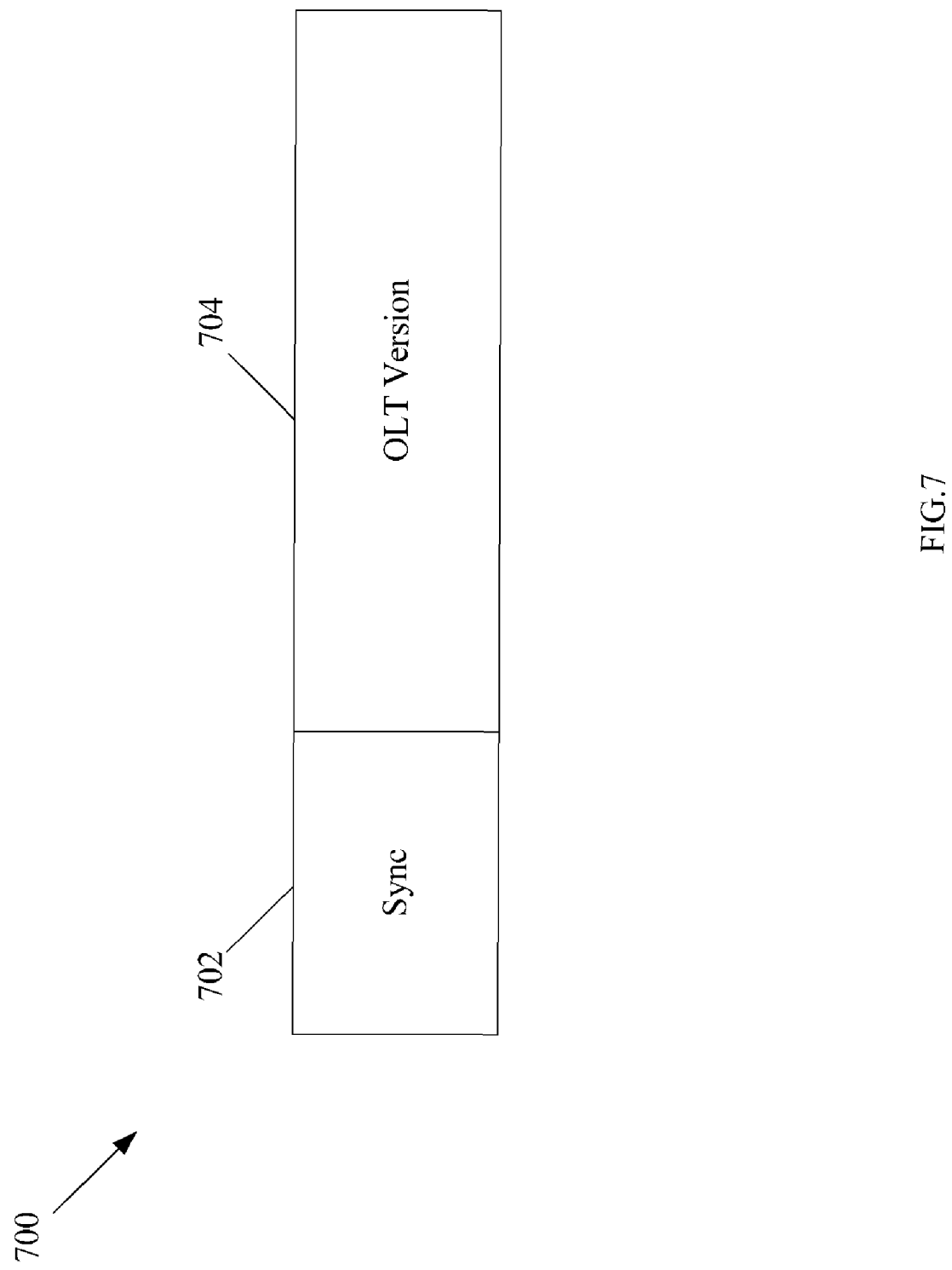
FIG. 7 is an illustration of another embodiment of a synchronization field.

FIG. 2 illustrates an embodiment of a PSync field 200, which may comprise delimiter information and additional synchronization information. The PSync field 200 may be inserted into a frame that comprises data before transmitting the frame, e.g. by a framer at an OLT or an ONU. When received, the information the PSync field 200 may be extracted, e.g. by a receiver at the OLT or the ONU, to synchronize the frame with other received frames. The PSync field 200 may comprise a synchronization (Sync) subfield 202 and a Time subfield 204. The Sync subfield 202 may indicate the beginning or end of the frame that comprises the PSync field 200. For instance, the Sync subfield 202 may comprise any known value or bit sequence that may be used to delimit a frame's beginning or end, such as used in Ethernet networks. The Time subfield 204 may comprise time information, e.g. according to a Precision Time Protocol (PTP). For instance, the Time subfield 204 may comprise real time clock (RTC) information, which may be used by the receiver to process the frame or the data in the frame.

In an embodiment, the information in the PSync field 200 may change in a plurality of transmitted frames. For instance, the synchronization pattern or bit sequence in the PSync field 200 may change as the RTC information in the Time subfield 204 changes in a sequence of transmitted frames. The synchronization pattern may be dependent on the RTC information, and hence a change in the synchronization pattern may be dependent on a change in the RTC information. Thus, the RTC information in a first received frame may be used to predict the synchronization pattern of a subsequent frame before receiving the next frame. The next received frame may then be aligned or locked properly after detecting an agreement or match between its synchronization pattern and the expected predicted synchronization pattern. For example, the RTC information may indicate the transmission time of a frame, and each frame may be transmitted after a transmission delay of about 125 microseconds (μs) from a previous frame. Hence, the transmission time of a first received frame may be obtained from the Time subfield 204, and then added to the transmission delay between frames (e.g. about 125 μs) to obtain an expected synchronization pattern of a second transmitted frame. The expected synchronization pattern may then be matched with an actual synchronization pattern in the second transmitted frame, which may be the Time subfield 204 of the second transmitted frame. As such, the expected synchronization pattern may be used to lock or align a next received frame with substantially high accuracy, e.g. using a synchronization state machine.

In an embodiment, the length of the PSync field 200 may be equal to about 12 bytes, the length of the Sync subfield 202 may be equal to about two bytes, and the length of the Time subfield 204 may be equal to about ten bytes. The length of the PSync field 200 may be increased in comparison to a typical length of about four bytes in current systems. At the length of about 12 bytes, the probability of having a mismatch between a properly predicted synchronization pattern of a frame and the actual synchronization pattern for that frame may be substantially small, e.g. equal to about $2^{-96}$ per frame. Additionally, at this length, it may require a substantially long time to encounter a false match, e.g. equal to about $10^{25}$ seconds, which may be longer than the lifetime of the universe. Due to the substantially low probability of having a mismatch in the synchronization pattern, a single attempt to match the synchronization pattern may be sufficient and repeated attempts for matching per frame may not be needed. Accordingly, a mismatch in the synchronization pattern may indicate an error in the sequence of transmitted frames with a substantially high probability. Further, errors in the frame header, e.g. PSync field 200, may have substantially low occurrence or error rate, e.g. equal to about $10^{-4}$ in about 100 frames. Such low error rate may be accounted for by a synchronization state machine.

In another embodiment, the Sync subfield 202 may be optional and the PSync field 200 may comprise the Time field 204. As such, when the Time field 204 is received, a synchronization pattern may be obtained based on the Time field 204. For instance, the synchronization pattern may be a CRC-16 pattern that may be computed using the Time field 204 information. Such scheme may also provide error detection and possibly error correction capability in the receiver.

FIGS. 3, 4, 5, 6, and 7 illustrate other embodiments of PSync fields 300, 400, 500, 600, and 700, respectively, which may comprise delimiter information and additional synchronization information. The PSync fields 300, 400, 500, 600, and 700 may be inserted into a frame that comprises data before transmitting the frame, and may then be received and used to improve frame synchronization efficiency. For instance, the PSync fields 300, 400, 500, 600, and 700 may be used in GPONs and XG-PONs. The PSync field 300 may comprise a Sync subfield 302 and a Key Index subfield 304. The PSync field 400 may comprise a Sync subfield 402 and a PON ID subfield 404. The PSync field 500 may comprise a Sync subfield 502 and a Burst Profile Index subfield 504. The PSync field 600 may comprise a Sync subfield 602 and an OLT Transmitter Power subfield 604. The PSync field 700 may comprise a Sync subfield 702 and an OLT Version subfield 704. The Sync subfields 302, 402, 502, 602, and 702 may be configured and comprise information substantially similar to the Sync subfield 202. The Key Index subfield 304, the PON ID subfield 404, and the Burst Profile Index subfield 504 may comprise different non-trivial information related to the PON components and operations. The OLT Transmitter Power subfield 604 may comprise parameters related to the power of the OLT's transmitter. The OLT Version subfield 704 may comprise parameters related to the OLT version, including hardware major and minor versions, firmware major and minor versions, and supported link layer identifier (LLID) number. The lengths of the PSync fields 300, 400, 500, 600, and 700 and subfields contained therein may be different. The PSync fields 300, 400, 500, 600, and 700 may also comprise additional subfields that comprise non-trivial information (not shown). Other embodiments of the PSync fields 300, 400, 500, 600, and 700, which may comprise a plurality of subfields and have different lengths, may also be used in other networks.

Figure 8:
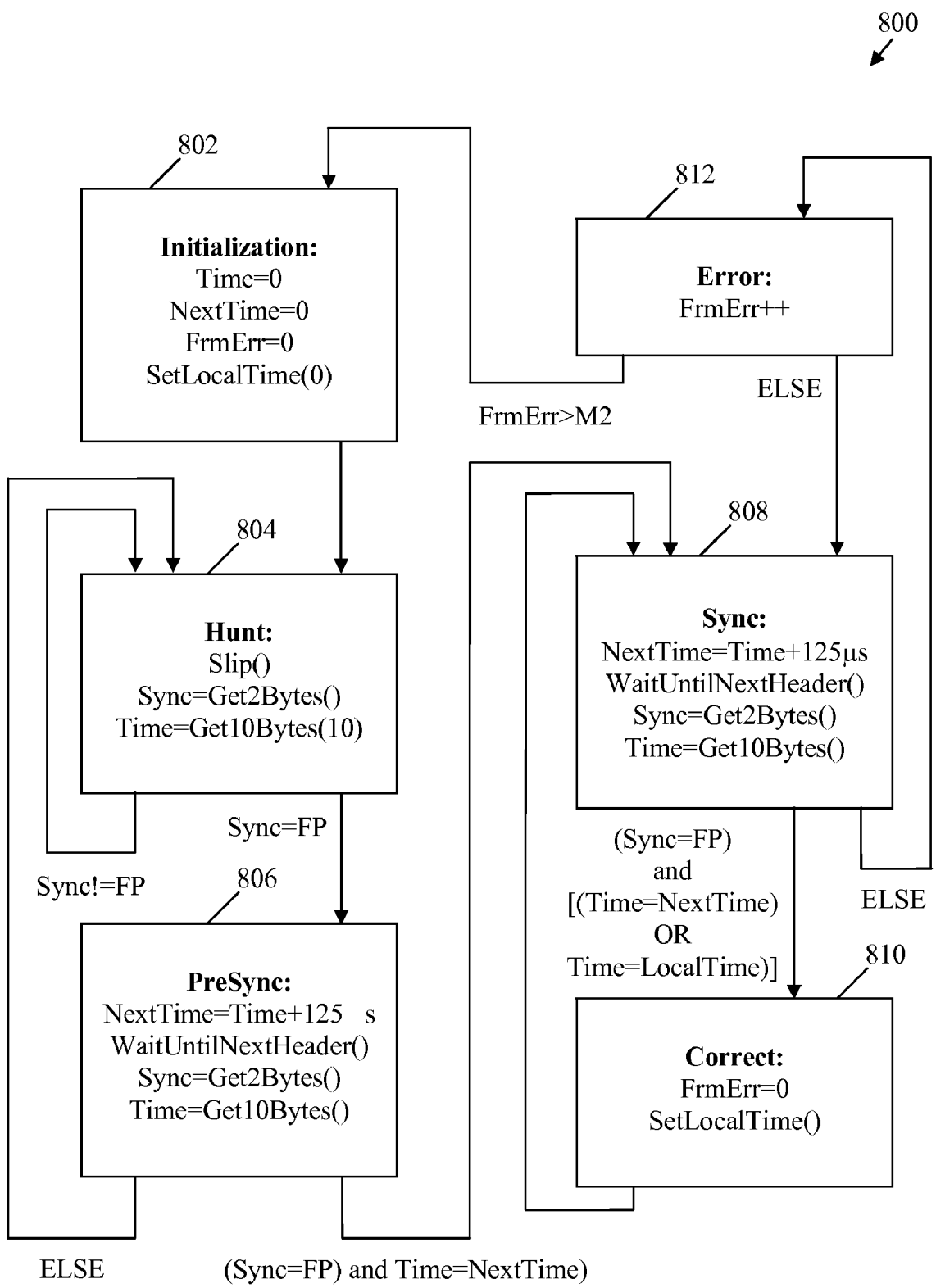
FIG. 8 is an illustration of an embodiment of a synchronization state machine method.

FIG. 8 illustrates an embodiment of a synchronization state machine 800, which may be used to process a synchronization field, such as the PSync field 200, 300, 400, 500, 600, and 700, and align or lock a plurality of received frames. The synchronization state machine 800 may be used in a receiver in an OLT and/or ONU. The synchronization state machine 800 may comprise a plurality of states, including an Initialization state 802, a Hunt state 804, a Pre-Synchronization (PreSync) state 806, a Sync state 808, a Correct state 810, and an Error state 812. The synchronization state machine method 800 may be started at the Initialization state 802. During the Initialization state 802, a plurality of parameters may be initialized. For instance, a Time parameter that indicates a received frame time may be set to about zero. Additionally, a NextTime parameter that indicates a received time of a next frame and a FrmErr parameter that indicates a count of encountered errors may each be set to about zero. A SetLocalTime( ) procedure may also be implemented, which may reset the receiver's local time to about zero. The synchronization state machine 800 may then proceed to the Hunt state 804.

During the Hunt state 804, a Slip( ) procedure may be implemented, which may cause a framer, e.g. in the receiver, to slip or shift to a new bit position in a bit sequence of the received frame. A Get2Bytes( ) procedure may then be implemented to load about two bytes from the frame, e.g. starting from the new bit position. The two bytes may then be assigned to a Sync parameter. Next, a Get10Bytes( ) procedure may be implemented to load about 10 bytes from the frame, e.g. after the previously loaded two bytes. The 10 bytes of data may then be assigned to the Time parameter. The data loaded in the Hunt state 804 may correspond to the information in a PSync field of the received frame, as shown above. The synchronization state machine 800 may then proceed to the PreSync state 806 if the obtained Sync parameter comprises a fixed pattern (FP), which may be known or standardized. Alternatively, the synchronization state machine 800 may return to the Hunt state 804 if the Sync parameter does not comprise the FP. Hence, a new Sync parameter and Time parameter may be loaded from the next bytes in the received frame.

During the PreSync state 806, the sum of the Time parameter value and a transmission delay between frames (e.g. 125 microseconds (µs)) may be assigned to the NextTime parameter. As such, the NextTime parameter may comprise a predicted arrival time for a next received frame. A WaitUntilNextHeader( ) procedure may then be implemented, which may cause the synchronization state machine 800 to wait until a next header is received in a next received frame. Next, the Get2Bytes( ) and Get10Bytes procedures may be implemented in that sequence to load a new Sync parameter and a new Time parameter from the next frame or header. The synchronization state machine 800 may then proceed to the Sync state 808 if the obtained Sync parameter comprises the FP and if the Time parameter value is equal to about the NextTime parameter value. This condition may indicate that the synchronization information in the currently received frame may match to the expected or predicted synchronization information. Alternatively, the synchronization state machine 800 may return to the Hunt state 804 if the Sync parameter does not comprise the FP or if the Time parameter value is not equal to about the NextTime parameter value.

During the Sync state 808, the NextTime parameter may be updated to comprise the sum of the current Time parameter value and the transmission delay between frames (e.g. 125 µs). Next, the WaitUntilNextHeader( ) the Get2Bytes( ) and the Get10Bytes procedures may be implemented in that sequence. If the currently obtained Sync parameter comprises the FP and if either: the Time parameter value is equal to about the NextTime parameter value or about the LocalTime parameter value, the synchronization information in the currently received frame may match the expected or predicted synchronization information. As such, the currently received frame may be locked or aligned properly, and the synchronization state machine 800 may then proceed to the Correct state 810. Alternatively, the synchronization state machine 800 may proceed to the Error state 808 if the condition above is not met.

During the Correct state 810, the FrmErr parameter that indicates the count of encountered errors may be reset to about zero, and the SetLocalTime( ) procedure may be implemented to reset the local time. The synchronization state machine 800 may then return to the Sync state 808 to resume the synchronization procedure of subsequent frames in the absence of detected errors.

During the Error state 812, the FrmErr parameter may be incremented, e.g. by about one, to indicate that a matching error was encountered. The synchronization state machine 800 may then return to the Initialization state 802 if the FrmErr parameter value has exceeded about a maximum tolerated value M2, which may be equal to about eight or any other number. In this case, the frames may be considered in wrong alignment and the synchronization state machine 800 may be restarted to check the frame's alignment again. Alternatively, if the FrmErr parameter value has not exceeded the maximum tolerated value M2, the synchronization state machine 800 may return to the Sync state 808 to continue the synchronization procedure. As such, relatively few isolated or random errors, which may not be alignment errors, may not stop frame alignment. For example, some errors may be caused due to changes in local time and may not affect frame alignment in the long run.

Note that the real time clock will be modified (e.g. at the OLT) from time to time (e.g. leap seconds, etc.) When this happens, other components (e.g. the ONUs) may detect a single framing error, but due to the state machine, it will not fall out of lock. On the next frame, the Time will match the NextTime, and the local time on the ONU will be adjusted.

Figure 9:
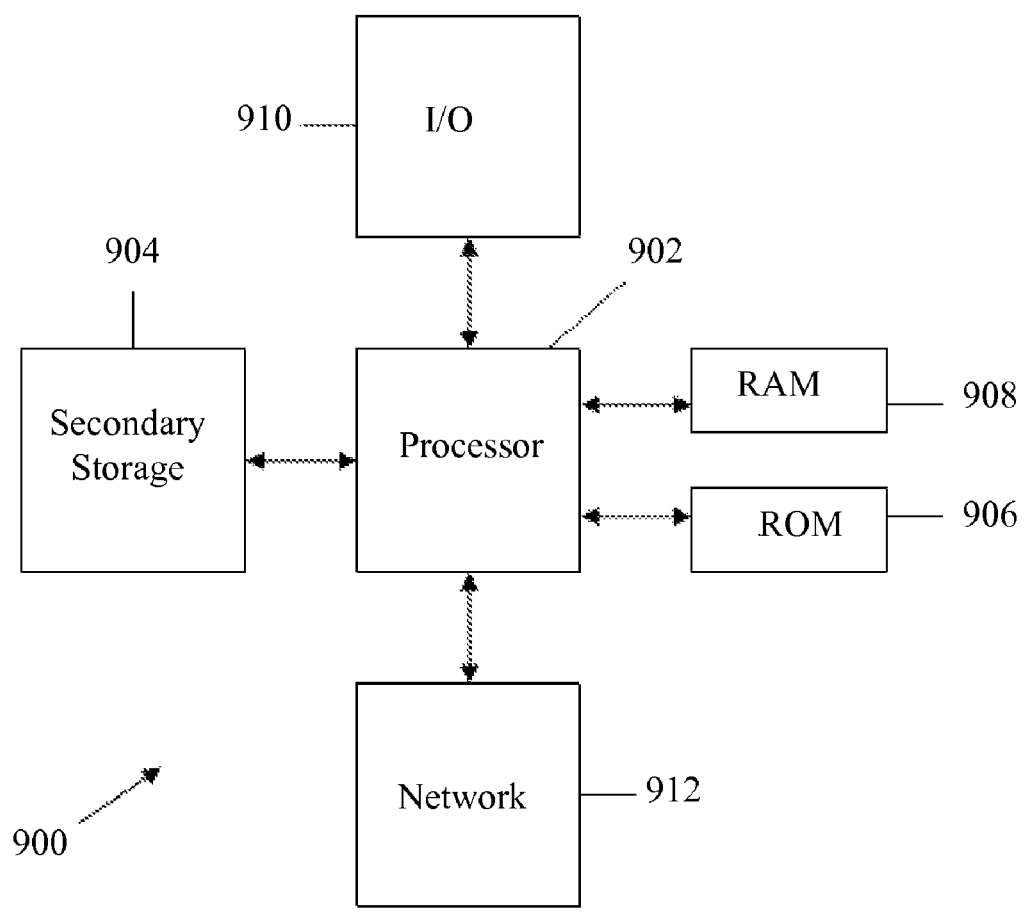
FIG. 9 is a schematic diagram of an embodiment of a general-purpose network component.

The network components described above may be implemented on any general-purpose network component, such as a computer or network component with sufficient processing power, memory resources, and network throughput capability to handle the necessary workload placed upon it. FIG. 9 illustrates a typical general-purpose network component 900 suitable for implementing one or more embodiments of the components disclosed herein. The network component 900 includes a processor 902 (which may be referred to as a central processor unit or CPU) that is in communication with memory devices including secondary storage 904, read only memory (ROM) 906, random access memory (RAM) 908, input/output (I/O) devices 910, and network connectivity devices 912. The processor 902 may be implemented as one or more CPU chips, or may be part of one or more application specific integrated circuits (ASICs).

The secondary storage 904 is typically comprised of one or more disk drives or tape drives and is used for non-volatile storage of data and as an over-flow data storage device if RAM 908 is not large enough to hold all working data. Secondary storage 904 may be used to store programs that are loaded into RAM 908 when such programs are selected for execution. The ROM 906 is used to store instructions and perhaps data that are read during program execution. ROM 906 is a non-volatile memory device that typically has a small memory capacity relative to the larger memory capacity of secondary storage 904. The RAM 908 is used to store volatile data and perhaps to store instructions. Access to both ROM 906 and RAM 908 is typically faster than to secondary storage 904.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

What is claimed is:

1. A method for synchronization performed by an optical network unit (ONU) in a passive optical network (PON), comprising:
   receiving, by the ONU, a frame comprising frame delimitation information and synchronization-related information;
   performing, by the ONU, a first verification based on a comparison of the frame delimitation information and a fixed pattern;

performing, by the ONU, a second verification based on a comparison of the synchronization-related information and a value associated with synchronization-related information in a previously received frame;

proceeding, by the ONU, to a synchronization state if both the first verification and the second verification are successful; and returning, by the ONU, to a hunt state if either the first verification or the second verification fails.

2. The method for synchronization of claim 1, wherein the first verification and the second verification are performed during a PreSync state.

3. The method for synchronization of claim 2, wherein the frame is received during the PreSync state and the previously received frame is received during a previous hunt state.

4. The method for synchronization of claim 1, wherein the value associated with synchronization-related information in a previously received frame is derived by adding an increment to a second value of synchronization-related information in the previously received frame.

5. The method for synchronization of claim 1, wherein the frame delimitation information comprises a physical synchronization (PSync) field.

6. The method for synchronization of claim 1, wherein the frame further comprises a PON identifier (ID).

7. The method for synchronization of claim 1, wherein the frame further comprises frame error information that indicates encountered errors.

8. The method for synchronization of claim 1, wherein the synchronization-related information comprises time information.

9. An optical network unit (ONU), comprising:

a receiver configured to receive frames from an optical line terminal (OLT);

a processor coupled to the receiver and configured to:

obtain frame delimitation information and synchronization-related information from a frame received from the OLT;

perform a first verification based on a comparison of the frame delimitation information and a fixed pattern;

perform a second verification based on a comparison of the synchronization-related information and a value associated with synchronization-related information in a previously received frame from the OLT;

cause the ONU to proceed to a synchronization state if both the first verification and the second verification are successful; and cause the ONU to return to a hunt state if either the first verification or the second verification fails.

10. The ONU of claim 9, wherein the first verification and the second verification are performed during a PreSync state.

11. The ONU of claim 10, wherein the frame is received during the PreSync state and the previously received frame is received during a previous hunt state.

12. The ONU of claim 9, wherein the value associated with synchronization-related information in a previously received frame is derived by adding an increment to a second value of synchronization-related information in the previously received frame.

13. The ONU of claim 9, wherein the frame delimitation information comprises a physical synchronization (PSync) field.

14. The ONU of claim 9, wherein the frame further comprises a passive optical network identifier (PON ID).

15. The ONU of claim 9, wherein the frame further comprises frame error information that indicates encountered errors.

16. The ONU of claim 9, wherein the synchronization-related information comprises time information.

17. A passive optical network (PON) system, comprising:

an optical line terminal (OLT); and at least one optical network unit (ONU) coupled to the OLT and configured to:

receive a frame comprising frame delimitation information and synchronization-related information from the OLT;

perform a first verification based on a comparison of the frame delimitation information and a fixed pattern;

perform a second verification based on a comparison of the synchronization-related information and a value associated with synchronization-related information for a previously received frame from the OLT;

proceed to a synchronization state if both the first verification and the second verification are successful; and return to a hunt state if either the first verification or the second verification fails.

18. The PON system of claim 17, wherein the first verification and the second verification are performed during a PreSync state of an ONU.

19. The PON system of claim 18, wherein the frame is received during the PreSync state and the previously received frame is received during a previous hunt state of an ONU.

20. The PON system of claim 17, wherein the value associated with synchronization-related information in a previously received frame is derived by adding an increment to a second value of synchronization-related information in the previously received frame.

* * * * *